(12) United States Patent
Fursdon

(10) Patent No.: US 8,702,074 B2
(45) Date of Patent: Apr. 22, 2014

(54) CONTROLLING VIBRATIONS

(75) Inventor: Peter Michael Trewhella Fursdon, Bradford on Avon (GB)

(73) Assignee: DTR VMS Limited, Wiltshire (GB)

( * ) Notice: Subject to any disclaimer, the term of this patent is extended or adjusted under 35 U.S.C. 154(b) by 0 days.

(21) Appl. No.: 12/972,909

(22) Filed: Dec. 20, 2010

(65) Prior Publication Data
US 2011/0089308 A1    Apr. 21, 2011

Related U.S. Application Data

(63) Continuation of application No. 11/214,646, filed on Aug. 30, 2005, now Pat. No. 7,878,489.

(30) Foreign Application Priority Data

Sep. 2, 2004  (GB) .................................. 04195129

(51) Int. Cl.
*F16F 5/00*   (2006.01)

(52) U.S. Cl.
USPC ................. 267/140.11; 267/140.15; 248/550; 248/562

(58) Field of Classification Search
USPC ........... 267/140.11, 140.14, 140.15; 248/550, 248/561, 562, 636, 638; 700/28, 280
See application file for complete search history.

(56) References Cited

U.S. PATENT DOCUMENTS

| | | | |
|---|---|---|---|
| 4,657,232 A | 4/1987 | West | |
| 4,690,389 A | 9/1987 | West | |
| 5,170,433 A | 12/1992 | Elliott et al. | |
| 5,243,512 A | 9/1993 | Putman et al. | |
| 5,310,137 A | 5/1994 | Yoerkie, Jr. et al. | |
| 5,333,819 A | 8/1994 | Stetson, Jr. | |
| 5,439,204 A | 8/1995 | Yamazoe et al. | |
| 5,713,438 A | 2/1998 | Rossetti et al. | |
| 6,170,622 B1 | 1/2001 | Wakui et al. | |
| 6,254,069 B1 | 7/2001 | Muramatsu et al. | |
| 6,464,213 B1 | 10/2002 | Kojima | |
| 6,688,422 B2 * | 2/2004 | Fuesser et al. | 181/206 |
| 6,796,183 B2 * | 9/2004 | Noell | 73/593 |
| 2002/0158180 A1 | 10/2002 | Noell | |
| 2002/0164038 A1 * | 11/2002 | Fuesser et al. | 381/71.4 |
| 2003/0030203 A1 | 2/2003 | Nemoto | |
| 2004/0195040 A1 * | 10/2004 | Vaishya et al. | 181/206 |
| 2005/0017420 A1 | 1/2005 | Nemoto et al. | |

FOREIGN PATENT DOCUMENTS

| | | |
|---|---|---|
| EP | 0262544 | 4/1988 |
| EP | 0560364 A | 9/1993 |
| GB | 235054 A | 3/2001 |
| JP | 2004270783 A | 9/2004 |

* cited by examiner

*Primary Examiner* — Thomas Irvin
(74) *Attorney, Agent, or Firm* — McGarry Bair PC

(57) ABSTRACT

In order to control vibrations of two parts of a piece of machinery, a variable force may be generated to oppose the vibrations, with the variable force being generated under control of a controller on the basis of an iterative relationship, the iterative relationship being such as to generate the force of one iteration using a controller output signal in frequency domain vector form derived from the controller output signal of the immediately previous iteration in frequency domain vector form plus a frequency domain vector quantity derived from the resultant vibration of more than one previous iteration. Where these two parts are connected by multiple (f) mounting devices, the controller output signals a previous iterations are taken into account, and the frequency domain vector quantity derived from the controller output signals and more than f previous iterations. The information corresponding to the vibration frequency may be derived from a rotating shaft, where the two parts are the engine and chassis of a vehicle. It is also possible generate a force between the two parts which is a harmonic of the frequency of vibration being suppressed.

6 Claims, 7 Drawing Sheets

CONTROLLING VIBRATIONS

CROSS-REFERENCE TO RELATED APPLICATIONS

This application is a continuation of U.S. patent application Ser. No. 11/214,646, filed Aug. 30, 2005, which claims the benefit of GB04195129, filed Sep. 2, 2004, both of which are incorporated herein by reference in their entirety.

BACKGROUND OF THE INVENTION

1. Field of the Invention

The present invention relates to the control of vibrations. It is particularly, but not exclusively, concerned with controlling vibrations in an automobile, such as vibrations between the engine and its mounting.

2. Description of the Related Art

EP-A-0115417 and EP-A-0172700 discussed two different types of hydraulically damped mounting devices for damping vibration between two parts of a piece of machinery, e.g. a car engine and a chassis. EP-A-0115417 disclosed various "cup and boss" type of mounting devices, in which a "boss", forming one anchor part to which one of the pieces of machinery was connected, was itself connected via a deformable (normally resilient) wall to the mouth of a "cup", which was attached to the other piece of machinery and formed another anchor part.

The cup and the resilient wall then defined a working chamber for hydraulic fluid, which was connected to a compensation chamber by a passageway (usually elongate) which provided the damping orifice. The compensation chamber was separated from the working chamber by a rigid partition, and a flexible diaphragm was in direct contact with the liquid and, together with the partition formed a gas pocket.

In EP-A-0172700 the mounting devices disclosed were of the "bush" type. In this type of mounting device, the anchor part for one part of the vibrating machinery is in the form of a hollow sleeve with the other anchor part in the form of a rod or tube extending approximately centrally and coaxially of the sleeve.

In EP-A-0172700 the tubular anchor part was connected to the sleeve by resilient walls, which defined one of the chambers in the sleeve. The chamber was connected via a passageway to a second chamber bounded at least in part by the bellows wall which was effectively freely deformable so that it could compensate for fluid movement through the passageway without itself significantly resisting that fluid movement.

Both the two types of mounting devices discussed above are passive, in the sense that they have components which are influenced by vibrations, and thus provide damping, but do not actively seek to counter those vibrations by applying opposed vibrations. In EP-A-0262544, a modification of the "cup and boss" type mounting device was proposed, in which the damping characteristics of the mount were changeable in dependence on frequency of vibration. This provided a "semi-active" mount, but still did not provide a mounting device in which there was active imposition of vibrations to counter the vibrations applied to the mounting device. However, it is known to apply such vibrations, to provide an active mount in which there is cancellation of the vibrations applied thereto. Such mounts sense the presence of steady periodic components in the vibration applied to the mount, e.g. from an automobile engine, and by appropriate manipulation develop an opposing variable force leading to cancellation of the vibrations, so that the vibrations are not transmitted to the supporting structure. In such active mounts, there must be a control relationship between the vibrations applied to the mounting device and the opposed vibrations generated by the mounting device. Existing relationships depend on prior knowledge of the characteristics of the mount, which are assumed to remain fixed. It is assumed the vibration input is predominantly of a steady periodic form e.g. a sine wave (say of frequency .omega.) with additional smaller random content. The aim of vibration cancellation is to input into the system an addition vibration signal which will cancel the input (i.e. a sine wave of the same frequency and amplitude but 180.degree. out of phase). The main problem in achieving this is that generally structural components, through which the vibrations pass, tend to change both the vibration amplitude and phase. This means that what might appear to be the correct phase of a cancellation signal at one point in the structure may well be detrimental at another.

The steady periodic waveform being cancelled may be considered a superposition of a number of component sinusoidal waveforms (Fourier components) have differing frequencies amplitude and phase relative to each other. Each may be characterized by its magnitude and phase relative to some reference. Thus in the following, a particular Fourier component, of a time domain signal (say x(t)) is represented as a frequency domain vector x. Similarly the characteristics of the structure (and associated control system) through which these signals pass may be simplified by breaking it down into blocks each of which is known to have some effect on phase and amplitude of steady periodic signals. For example an accelerometer may convert a vibration expressed as a displacement amplitude into a voltage signal of a differing amplitude. The voltage signal from a perfect accelerometer will also be 180.degree. out of phase relative to the input. Similarly an actuator should produce a force that seeks to be proportional to the displacement input voltage but in practice the force is likely to lag the input due to, e.g. inductance within the actuator mechanism. Quantitatively these effects are expressed as transfer function which give the change in phase and amplitude gain as a function of frequency. Known control systems have made use of iterative relationships following conversion of the vibrations into frequency domain phase and magnitude values.

Thus, in GB-A-2354054 use was made of vector algebra in the frequency domain and it was proposed that an iterative relationship be used in which a new vector of one iteration is derived from the old vector of the previous iteration, plus a quantity derived from historic feedback, again in vector form. A controller is then used to generate output signals for the respective iterations with the output signals being in frequency domain vector form such that the output signal of one iteration is derived from the controller output signal of the immediately previous iteration in frequency domain vector form plus a frequency domain vector quantity derived from the resultant vibration of more than one previous iteration.

The system shown diagrammatically in FIG. 1 of the accompanying drawings (which will be discussed in more detail later) can be expressed using transfer functions (G) in a block diagram as shown in FIG. 2 of the accompanying drawings. From this it is possible to write an expression for the output vibration in term of all the component effects. Each path is summed independently and the effect of the components in each path is simply the product of all the component transfer functions.

Note that, in FIG. 2, x y are the frequency domain vector representations of a Fourier component of the input and output signal, respectively. u is an output vector signal controlling the force applied to the mount by the control system.

In such a system, for a given unknown steady input x it is possible to express the relationship between y and u as follows:

$$y = [R]u + u_0 \tag{1}$$

where [R] and $u_0$ are unknowns dependent on the system transfer functions and the input x. The optimum controller output u' leading to zero output y can then be expressed:

$$u' = -[R]^{-1} u_0 \tag{2}$$

It is possible to find a solution for u' if two u, y data pairs exist $(u_{n-1}, y_{n-1}, u_n, y_n)$ $$u' = u_n - [R]^{-1} y_n$$

Where $[R]^{-1}$ is a matrix:

$$r1 - r2 r2 r1 \text{ or } r1 r2 - r2 r1 r_1 = (|(y_{n-1} - y_n)|)^{-2} \{(y_{n-1} - y_n)(u_{n-1} - u_n)\}$$

$$r_2 = (|(y_{n-1} - y_n)|)^{-2} \{|(y_{n-1} - y_n) . \text{times.} (u_{n--1} - u_n)|\}$$

(NB " "—dot or scalar product ".times."—cross or vector product)

The above is converted in an iterative control relationship that searches for the next best value of $u'_{(n+1)}$ based on the evidence of the last two attempts $u'_{(n)}, u'_{(n-1)}$.

$$u'_{(n+1)} = u'_{(n)} - A[R_{(n,n-1)}]^{-1} y_{(n)} + p(n)$$

$R_{(n1\ n-1)}]^{-1}$ is the $[R]^{-1}$ matrix based on the $n^{th}$ and $n-1^{th}$ iterations as defined above.

A is a scalar (0>A>1) defining rate of convergence and stability and p(n) is an optional small perturbation.

Hence, GB-A-2354054 proposed that the iterative control relationship defined above was applied to the active control of a mounting device, e.g. to one Fourier component, or any number or all of the Fourier components of the vibration.

Preferably, the value of A is in the range 0.1 to 0.3 and although the perturbation p(n) may be zero, it is preferably one percent or less of the size of the normal control output.

When such an arrangement was used in a hydraulically damped mounting device, it was necessary to drive the mounting device in accordance with the value of u. The mounting devices of EP-A-0115417 and EP-A-0172700 do not have means for applying such a driving force to the hydraulic fluid, since they are passive mounts as previously described, and therefore GB-A-2354054 disclosed mounts in which such a drive force could be applied.

BRIEF DESCRIPTION OF THE INVENTION

The present invention, in its various aspects, is concerned with modifications and developments of the active mount disclosed in GB-A-2354054. The first aspect of the present invention is concerned with the applications of the technique of GB-A-2354054 to multiple mounts. The algorithms of GB-2354054 were concerned e.g. with where an automobile engine is mounted on a chassis via a single mounting device, but there are two mounting devices it is necessary to ensure that they are not driven in a way which causes their actions to conflict. If there were two mounting devices, but the controller arrangements were completely separate, then it would be possible for one mount to be driven in a way which would counteract the effect of the other mount, thereby defeating the aims of the active controller mount.

It is possible to apply the techniques discussed above to the case where there are two mounts, and the analysis given above may be applied. However, the terms y, u', and [R] need to be modified.

In particular, y now represents a vector with 2*f elements where f is the number of active mounts e.g. $y = [y_{i1}\ y_{o1}\ y_{i2}\ y_{o2}\ \ldots]$. Each $y_{i1}\ y_{o1}$ pair describes the vector (phasor) representation of the error signal in a similar way to that in GB-A-2354054. Similarly u' now represents a vector with 2*f elements e.g. $u' = [u_{i1}\ u_{o1}\ u_{i2}\ u_{o2}\ \ldots]$ where each $u_{i1}\ u_{o1}$ pair describes the vector (phasor) representation of the output signal as in the existing patent. [R] now represents a 2*f by 2*f matrix.

Thus, for a 2 mount system $$r11,1-r11,2 r12,1-r12,2 r11,1 r12,2 r12,1 r21,1-r21,2 r22,1-r22,2 r21,2 r21,1 r22,2 r22,1$$

In this case [R] has 8 unknowns which are solved at each iteration from the following:

$$(y_n - y_{n-1}) = [R](u'_n - u'_{n-1}) \ldots$$
equivalent to 4 equations $$(y_{n-1} - y_{n-2}) = [R](u'_{n-1} - u'_{n-2}) \ldots$$
equivalent to 4 equations where $y_n = y$ at the nth iteration Hence, in this aspect of the invention, it is necessary to use information from preceding two iterations, unlike the arrangements discussed in GB-A-2354054 where it was necessary to consider only one preceding iteration. In general, there are 2*f equations which require the use of information from the preceding p iterations to find a solution for [R].

Thus, in the first aspect of the invention there is provided a method of controlling vibrations between two parts of a structure interconnected by f mounting devices, where f is an integer greater than 1, comprising damping vibrations between the two part of the structure, detecting the vibrations between the two parts of the structure, generating variable forces to oppose the vibrations transmitted by each of the f mounting devices, and detecting any resultant vibrations due to the net effect of said vibrations and said variable forces; wherein the forces are generated under control of a controller on the basis of an iterative relationship, the iterative relationship being such as to generate the forces of one iteration using controller output signals in frequency domain vector form derived from the controller output signals off immediately previous iterations in frequency domain vector form plus a frequency domain vector quantity derived from the controller output signals and the resultant vibrations of more than f previous iterations.

Moreover, this aspect of the invention also provides an apparatus for controlling vibrations between two parts of a structure comprising f mounting devices interconnecting the two parts of the structure, where f is an integer greater than 1, at least one detector for detecting the vibrations between the two parts of the structure and actuators for generating a variable forces to oppose the vibrations transmitted by the respective f mounting devices, the at least one detector being arranged to detect the resultant vibrations due to the net effect of said vibrations and said variable forces; wherein the actuators for generating the variable forces are arranged to be controlled by the controller to generate the forces on the basis of an iterative relationship, the iterative relationship being such as to generate the forces of one iteration using controller output signals in frequency domain vector form derived from the controller output signals of f immediately previous iterations in frequency domain vector form plus a frequency domain vector quantity derived from the controller output signals and the resultant vibrations of more than f previous iterations.

Thus, a more complex iteration arrangement is used, but the techniques are similar to those disclosed in GB-A-2354054.

In GB-A-2354054, it was assumed that the intention of the active control of the mounting device was to generate vibrations within the mounting device which would cancel the vibrations applied to the mounting device. This would eliminate, or at least significantly reduce, transmission of vibrations via the mounting device.

However, it has been realised that, at least for aesthetic purposes, it is sometimes desirable to apply a vibration which is not the same as the vibration input. Consider an engine vibrating in a vehicle. The techniques discussed above, and in GB-A2354054, it may be possible to control the chassis so as substantially to eliminate the vibrations of the engine which are transmitted to the chassis. This eliminates the vibrations that are transmitted to the driver and passengers since the vibrations of the engine are not transmitted via the chassis to the driver and passengers, and the chassis does not vibrate to generate sounds which would be transmitted to the driver and passenger. However, it is not always desirable wholly to eliminate such transmissive or audio vibrations. Some help driver control, and other sounds may be seen as desirable. For example, the driver of a vehicle with a four cylinder engine may want to hear the sounds associated with a more powerful 6 or 8 cylinder engine.

Therefore, a second aspect of the present invention proposes that the mounting device be driven to impart a desired vibration to the two parts (such as the engine and chassis) connected by the mounting device. The frequency of that desired vibration is derived from one or other of the two parts, and/or from the vibrations therebetween, but is a harmonic of that frequency.

Thus, the second aspect may provide a method of controlling vibrations between two parts of a structure via at least one mounting device connected between the two parts of the structure, wherein:

a frequency value is derived from at least one of the two parts and/or the vibrations therebetween;

a signal representing a harmonic of said frequency value is derived; and the mounting device is controlled to generate a force between the two parts such as to drive said two parts to vibrate at a frequency corresponding to said harmonic This aspect may also provide an apparatus for controlling vibrations between two parts of a structure via at least one mounting device connected between the two parts of the structure, comprises:

a detector for detecting the vibrations between the two parts of the structure and generating a frequency value from at least one of the two parts and/or the vibrations therebetween;

a generator for generating a signal representing a harmonic of said frequency value; and a controller for controlling the at least one mounting device to generate a force between the two parts such as to drive said two parts to vibrate at a frequency corresponding to said harmonic.

Thus, if the two parts are an engine and a chassis, a frequency signal corresponding to the rate of engine rotation may be derived, and the mounting device controlled to generate a vibration corresponding to a harmonic of that engine frequency Preferably, a phase value is also derived from the at least one of the two parts and/or the vibrations therebetween, and the mounting device is controlled such that the two parts are driven to vibrate with the frequency corresponding the harmonic and with a phase related to the phase value derived.

In this aspect it is preferable, but not essential, that the control of the mounting device also suppresses unwanted vibrations, in a manner similar to the arrangements discussed with reference to the first aspect, or as in GB-A-2354054. In this development, the mounting device may be controlled to generate a variable force to oppose the vibrations, but that variable force is modified to generate the force at the frequency corresponding to the harmonic desired. Thus, for example, vibrations at twice engine speed, which are perceived as undesirable because they make the engine appear unrefined, may be reduced or eliminated, and a harmonic or harmonics associated with more refined engines imposed, e.g. at three or four times engine speed The third aspect of the present invention concerns the way of obtaining the components of the vector x being a Fourier component of the vibration input from the engine, and hence obtaining vector y representing the corresponding component of the output. In GB 2354054, an estimate was made of the frequency $\omega$ and $x_{i,n}$, $x_{o,n}$, $y_{i,n}$ and $y_{o,n}$ were calculated.

However, it has been realised that if the vibrations between an engine and a chassis are considered, the frequency components of the vibration are closely related to the output rotation of the engine. The vibrations tend to be at the rate of rotation, or at harmonics or sub-harmonics of it. Thus, rather than make use of vibration frequency $\omega$, it is possible to make use of a value such as a crank angle derived from the rotation of a shaft driven by the engine. That shaft may, for example, be a crank driven directly by the engine, therefore rotating at the speed of rotation of the engine, or some other shaft being driven at a speed related in a known way to the rate of engine rotation. Then, the value thus derived can be used to replace frequency $\omega$ in the techniques discussed in GB 2354054, and indeed those discussed with reference to the first and second aspects as referred to above. However, it is preferable that the derived value be used to replace the reference signal x defining the engine vibration input.

Thus, in this third aspect of the present invention there may be provided an apparatus for controlling vibrations between an engine and a chassis, comprising a mounting device between the engine and the chassis, a first detector for detecting the rotation of a shaft driven by the engine and an actuator for generating a variable force dependent on the rotation of the shaft to oppose the vibrations, a second detector for detecting any resultant vibration due to the net effect of said vibrations and said variable force, and a controller for controlling the actuator for generating the variable force, wherein the actuator for generating the force is arranged to be controlled by the controller to generate the force on the basis of an iterative relationship, the iterative relationship being such as to generate the force of one iteration using a controller output signal in frequency domain vector form derived from the controller output signal of the immediately previous iteration in frequency domain vector form plus a frequency domain vector quantity derived from the controller output signal and the resultant vibration of more than one previous iteration.

This aspect may also provide a method of controlling vibrations between an engine and a chassis, comprising:

detecting the rotation of a shaft driven by the engine;

damping vibrations between the two part of the structure, detecting the vibrations between the two parts of the structure, generating a variable force dependent on the rotation of the shaft to oppose the vibrations, and detecting any resultant vibration due to the net effect of said vibrations and said variable force; wherein;

the force is generated under control of a controller on the basis of an iterative relationship, the iterative relationship being such as to generate the force of one iteration using a controller output signal in frequency domain vector form derived from the controller output signal of the immediately previous iteration in frequency domain vector form plus a frequency domain vector quantity derived from the controller output signal and the resultant vibration of more than one previous iteration.

Moreover, this aspect may be combined with the first aspect, where there are multiple mounting devices, by making use of the proceeding f iterations. Thus, the frequency value used in that second aspect is derived from the rotation of the shaft driven by the engine. Again, the value may be the frequency rotation of that shaft, or may be the value derived from changes in crank angle which give a value equivalent to the rate of rotation, and thus may be the frequency value used in the second aspect.

Thus, this aspect may also provide an apparatus for controlling vibrations between an engine and a chassis, comprising f mounting devices between the engine and the chassis, where f is an integer greater than 1, a first detector for detecting the rotation of a shaft driven by the engine, actuators for generating variable forces dependent on the rotation of the shaft to oppose the vibrations in the respective f mounting devices, at least one second detector for detecting the resultant vibrations due to the net effect of said vibrations and said variable force; wherein the actuators for generating said variable forces are arranged to be controlled by the controller to generate the forces on the basis of an iterative relationship, the iterative relationship being such as to generate the forces of one iteration using controller output signals in frequency domain vector form derived from the controller output signals off immediately previous iterations plus a frequency domain vector form derived from the controller output signals and the resultant vibrations of more than f previous iterations.

It may also provide a method of controlling vibrations between an engine and a chassis interconnected by f mounting devices, where f is an integer greater than 1, comprising damping vibrations between the two part of the structure, detecting the vibrations between the two parts of the structure, generating variable forces dependent on the rotation of the shaft to oppose the vibrations in each of the f mounting devices and detecting any resultant vibrations due to the net effect of said vibrations and said variable force; wherein the forces are generated under control of a controller on the basis of an iterative relationship, the iterative relationship being such as to generate the forces of one iteration using controller output signals in frequency domain vector form derived from the controller output signals off immediately previous iterations in frequency domain vector form plus a frequency domain vector quantity derived from the controller output signals and the resultant vibrations of more than f previous iterations.

Preferably, the determination of the rotation of the shaft driven by the engine is based on a measurement of crank angle $\theta$. The crank angle $\theta$ can then be used to generate a sine wave which may be considered the direct measure of input signal vector x discussed in GB-A-2354054. The result vibration output of the chassis relative to input x may then be expressed as:

$$y_{i,n} = \mathrm{sum}(y(m)\sin\theta(m))/\mathrm{sum}(\theta(m)-\theta(m-1))$$

$$y_{o,n} = \mathrm{sum}(y(m)\cos\theta(m))/\mathrm{sum}(\theta(m)-\theta(m-1))$$

As mentioned above, the vibrations may be at harmonics of the engine speed, and thus the values of $y_{i,n}$ and $y_{o,n}$ may be generalised to the following, where c is the harmonic number:

$$y_{i,n} = \mathrm{sum}(y(m)\sin(c\theta(m)))/\mathrm{sum}(c\theta(m)-c\theta(m-1))$$

$$y_{o,n} = \mathrm{sum}(y(m)\cos(c\theta(m)))/\mathrm{sum}(c\theta(m)-c\theta(m-1))$$

In each case, the sums are carried out by processing a block of samples of fixed length (e.g. "k"). Preferably k is equal to the number of samples in a time period which is one to four times the period of the frequency to be cancelled. As in GB-A-2354054, this may then be converted to the time domain to give the $m^{th}$ sample output. The expression for this becomes:

$$u(m) = u_i \sin(c\theta(m)) + u_o \cos(c\theta(m))$$

All of the above aspects of the present invention may make use of a hydraulically damped mounting device in which one part of the mounting device is driven relative to the other to impose on the mounting device a forced vibration, in addition to its damping characteristics. For example, and as described in GB-A-2354054, the mounting device may have two anchor parts connected by a first deformable wall, a working chamber bounded by the first deformable wall and a rigid partition rigidly associated with a first one of the anchor parts, the working chamber containing hydraulic fluid, a compensation chamber for the hydraulic fluid, the compensation chamber being bounded by a second deformable wall, a passageway between the chambers to allow fluid communication therebetween, a flexible diaphragm in direct contact with the hydraulic fluid in the working chamber, the diaphragm acting as a barrier between the hydraulic fluid and a gas chamber and being fixed its periphery, and means for driving an intermediate part of the diaphragm to impart a vibration to the hydraulic fluid, wherein the means for driving the intermediate part of the diaphragm forms said means for generating the vibrations, and the damper is formed by the interaction of the hydraulic fluid and passageway.

However the present invention is not limited to the use of such a mounting device and other mounting devices may be used which provide active driving of the components of the mounting device to impose a vibrational force on the two parts connected by the mounting device, as well as, or instead of, providing passive damping.

DESCRIPTION OF AN EMBODIMENT OF THE INVENTION

Figure 1:
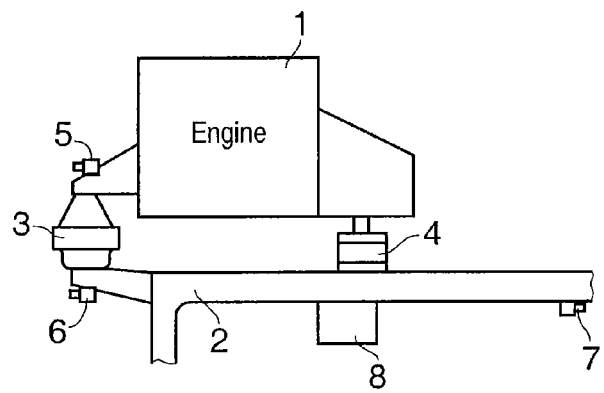
FIG. 1 shows the vibrating system to which the present invention may be applied.

Referring first to FIG. 1, an automobile engine 1 is mounted on a chassis 2 via a mounting device 3 which, as will be described in more detail later, provides active damping of the vibrations of the engine 1 relative to the chassis 2. The engine 1 may also be connected to the chassis 2 via other mounting devices 4 which do not provide such active damping. A feed-forward sensor 5, which may be e.g. an accelerometer, senses the input vibrations applied to the mounting device 3 from the engine 1, and a feed-back sensor 6 senses the vibrations which are transmitted to the chassis 2 via the mounting device 3.

The mounting device 3 can be considered to have two elements, namely a passive damping element, and an actuator element operating in parallel to the passive element. A control system senses the vibrations from the engine 1 via the sensor 5, and controls the actuator of the mount 3 with the intention of minimising the output sensed by the sensor 6. The outputs of the sensors 5 and 6 are thus used by the control device to determine the signals sent to the actuator.

Note that, in the above system, it would be possible to provide additional or alternative sensors such as a remote feed-back sensor 7, which in FIG. 1 is shown on a remote part of the chassis 2. That remote sensor could alternatively be a noise meter within the passenger cabin of the vehicle. It would also be possible for the actuator of the mount 3 to be replaced by a shaker 8 which provides cancellation of the vibrations from the engine 1 under the control of the controller. It is also possible to use a signal from an engine management system to derive a feed-forward signal either in addition to or as a replacement of sensor 5.

Figure 2:
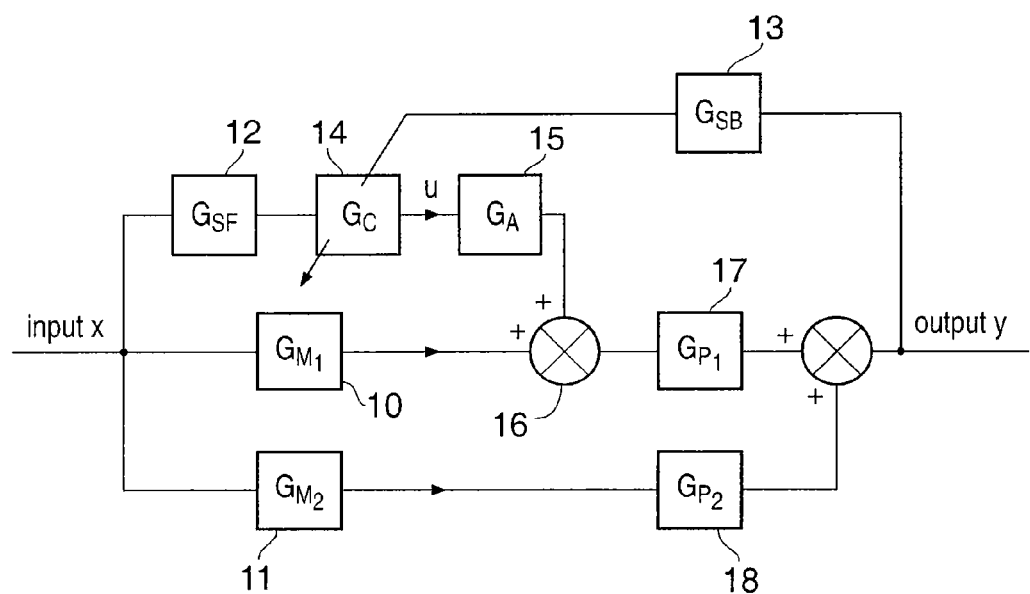
FIG. 2 is schematic block diagram of the system of FIG. 1.

The structure of FIG. 1 can be considered as a set of functions shown in the block diagram of FIG. 2. In FIG. 2, vector x represents a Fourier component of the vibration input from the engine, and vector y represents corresponding component of the output to the chassis 2. The system can then be divided into the functional blocks shown. Note that the arrangement shown in FIG. 2 may be provided for more than one Fourier component of the vibration input. In FIG. 2, the functional block 10 represents the passive aspects of the mount 3, and the functional block 11 represents the effect of other vibrations paths such as via the mount 4.

The function provided by the feed-forward sensor 5 is then shown at 12. The output y is fed back via a function 13 representing sensor 6 to the controller 14, which also receives the output of function 12. The controller 14 then generates an output signal to be fed to the function block 15 representing the active aspects of the mounting device 3. The outputs of functions 10 and 15 are thus combined at 16 to represent the characteristics of the mounting device 3, and those are themselves modified by a function 17 presenting the structural components to which the mounting device 3 is attached, such as mounting brackets, etc. These are combined with the output from function 11, modified by function 18 representing the structural effects of other vibration paths, to form the output y.

In such a system, consider an output u sent from the controller 14 which is some as yet unknown function of the sensed input vector x (i.e. u=Gx). u is still a vector representing a steady sine wave but it has an amplitude and phase relative to the input signal vector x now defined by a controller transfer function. The resultant vibration output y from the system will be given by the following $$y = \text{sum}(G_{mj} G_{pj}) x + G_a G_{pl} G_c x$$

j=1 to q where q is the number of vibration transfer paths
From this it can be seen that the output y will be zero if the following holds:

$$G_c = -(G_a G_{pl})^{-1} \text{sum}(G_{mj} G_{pj})$$

j=1 to q

It is possible to measure the transfer functions of each component and derive a controller which will achieve the desired effect. These transfer functions are difficult to measure reliably and cannot normally be transferred to other nominally identical structures due to build variations.

Figure 3:
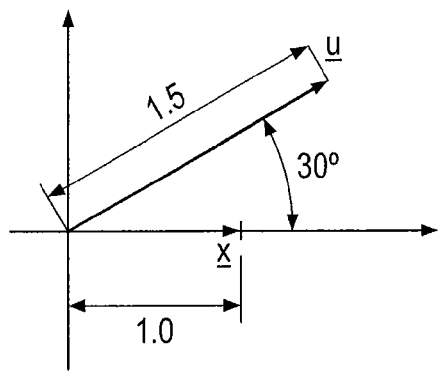
FIG. 3 is a phase diagram of the relation between u and x

The above discussion has considered vectors x, y and u being the vibration input from the engine 1, the vibration output to the supporting structure, and control output applied by the controller 14 via the mounting device 3. FIG. 3 shows an example of a controller output u expressed as a vector relative to the unit magnitude input x.

By convention x is shown on the x axis and in FIG. 3 u has arbitrarily a gain of 1.5 and a phase of 30_. In the following explanation the vectors are also defined by their Cartesian components.

Figure 4:
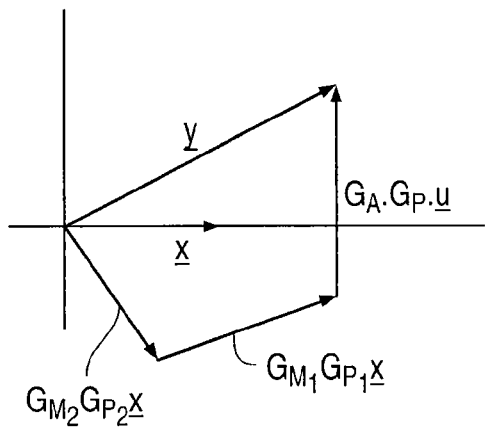
FIG. 4 is a phase diagram of the output y.
Figure 5A:
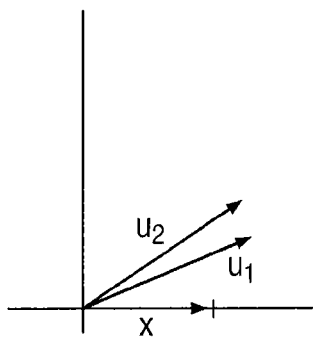
FIGS. 5*a* and 5*b* show examples of the relationship between u and y.
Figure 5B:
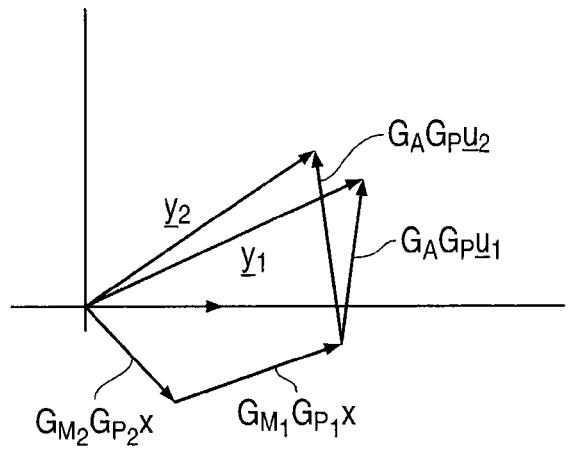
Figure 6:
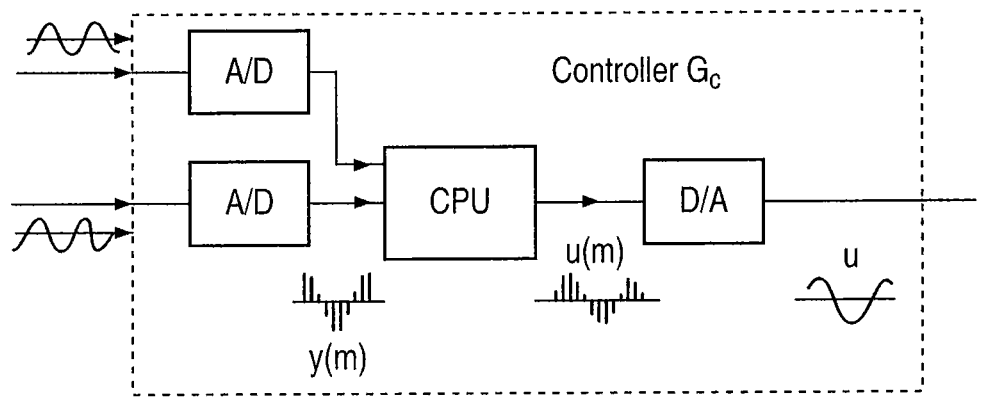
FIG. 6 is a schematic block diagram of a controller used in the present invention.

FIG. 4 shows the system response to this controller input as a vector y which is itself the resultant of the sum of the various vibration paths. FIGS. 5a and 5b then show two cases of controller output (shown on a plane defined here as the controller output plane $S_c$) and resulting system output (on a plane defined as the system output plane $S_s$).

The direct mapping between $S_c$ and $S_s$ can be expressed by the relationship used by the present invention, namely an iterative control relationship $u'_{(n+1)} = u'_{(n)} - A[R_{(n,n-1)}]^{-1} y_{(n)}$, which relationship has been referred to above.

Implementation of the above relationship may be achieved with the aid of a digital processor (i.e. a computer or a stand alone IC with DSP) which uses sampled data via D/A and A/D converters. To devise an algorithm to represent the relationship it is necessary to convert the time domain signal x(t) (the sequence of samples taken every sample interval (dt)) into a frequency domain representations in the form of a phase/gain vector or vectors. This is done by a method used more generally for filtering purposes. It involves analysis of blocks of samples data as described below.

One method of determining the phase and gain of y relative to the input x is by means of an additional internal artificial reference signal r which is an approximation of x. r represents a sine wave with frequency $\omega'$ which is the same or a close approximation to $\omega$, which is the true frequency of the particular Fourier component to be cancelled. In a sample case, $\omega'$ may be the frequency derived from the rate of rotation of the engine. Since $\omega$ does not always equal .omega.' there may be an additional phase difference between x and r but this can be determined by processing a block of samples of fixed length (e.g. "k"). Preferably k is equal to the number of samples in a time period which is one to four times the period of the frequency to be cancelled. Moreover, at least for x, this is repeated at every sample. For the n.sup.th iteration the in and out of phase components (x.sub.i x.sub.o respectively) of x relative to r is given by the following.

x.sub.i,n=sum(x(m)sin(.omega.'mdt))/k over the range {(n−1)k<m.ltoreq.(n)k} x.sub.o,n=sum(x(m)cos(.omega.'mdt))/k over the range {(n−1)k<m.ltoreq.(n)k}

Similarly for y relative to r y.sub.i,n=sum(y(m)sin(.omega.'mdt))/k over the range {(n−1)k<m.ltoreq.(n)k} y.sub.o,n=sum(y(m)cos(.omega.'mdt))/k over the range {(n−1)k<m.ltoreq.(n)k}

Figure 7:
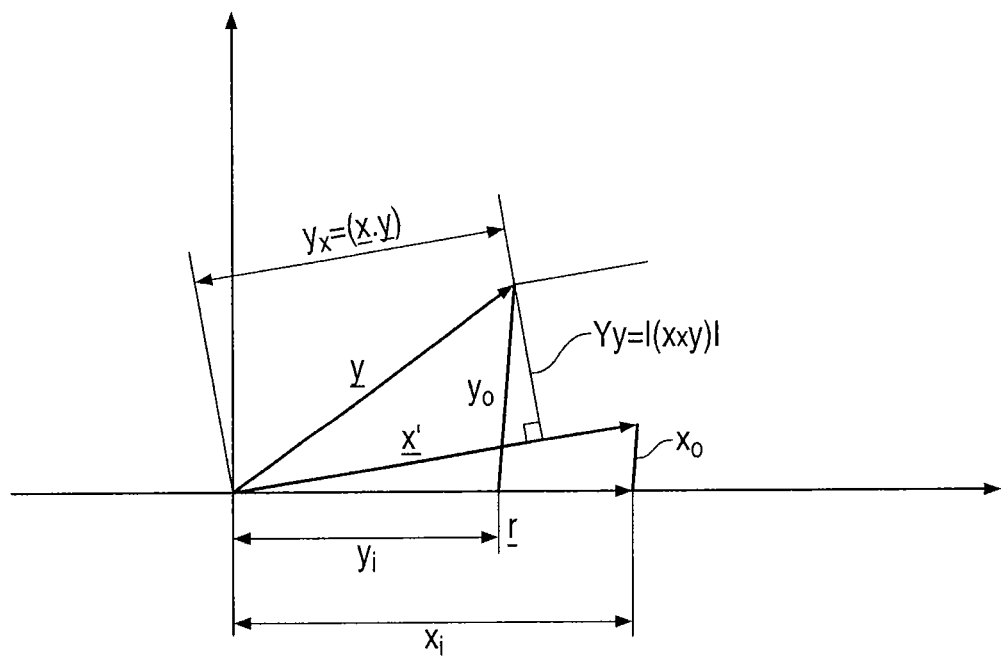
FIG. 7 shows the relationship between x, y and an artificial reference r.

Since x.sub.i, x.sub.o, y.sub.i, y.sub.o are the vector components of x and y relative to r respectively (i.e. x is a vector (x.sub.i, x.sub.o)), the vector components of y relative to x is given by the dot and vector products. (see FIG. 7)

y.sub.i,n=(1/|x|xy y.sub.i,n=(1/|x|)|x.times.y|

The above gives the n.sup.th block reading of the phase and gain in cartesian form of the identified Fourier component of the output y(t) relative to the input x(t). It may be calculated in block form at every k samples to give a stepwise control function or it may be calculated as a running sum at each sample for more continuous control strategies. In the former it may be preferable to ignore a number of samples between blocks to reduce the destabilizing effects of transient caused by the previous block control signal. This process may be repeated for each Fourier component to be cancelled. In this form it can be used in the iterative algorithm described above.

The algorithm will produce the next estimate of the best control output as a vector u' with components u.sub.i, u.sub.o. This can be converted to the time domain to give the m.sup.th sample output from the controller using the following expression:

u(m)=(x.sub.iu.sub.i−x.sub.0u.sub.o)sin(.omega.'mdt)+ (x.sub.ou.sub.i+x.sub−.iu.sub.o)cos(.omega.'mdt)

Since the aim of the algorithm is to produce a zero output y it follows that with convergence, the n.sup.th solution for u' approaches that of n−1. In these circumstances the algorithm will sleep even if y subsequently changes. To prevent this a small perturbation is continuously applied to u. This perturbation is typically one thousandth of the size of the normal control output. A revised version of the algorithm is as follows:

u'.sub.(n+1)=u'.sub.(n)+[R.sub.(n,n−1)].sup.−1y.sub. (n)+p(n)

p.sub.(n+1)=−p.sub.(n)

As has previously been mentioned, it is preferable that the vector u' is applied to the vibrating system using a hydraulically damped mounting device. In accordance with the second aspect of the invention previously mentioned, the vector u' is applied to control the diaphragm of the hydraulically damped mounting device of the cup and boss type, which is disclosed in EP-A-0115417.

Embodiments of such hydraulically damped mounting devices will now be described in more detail.

Figure 8:
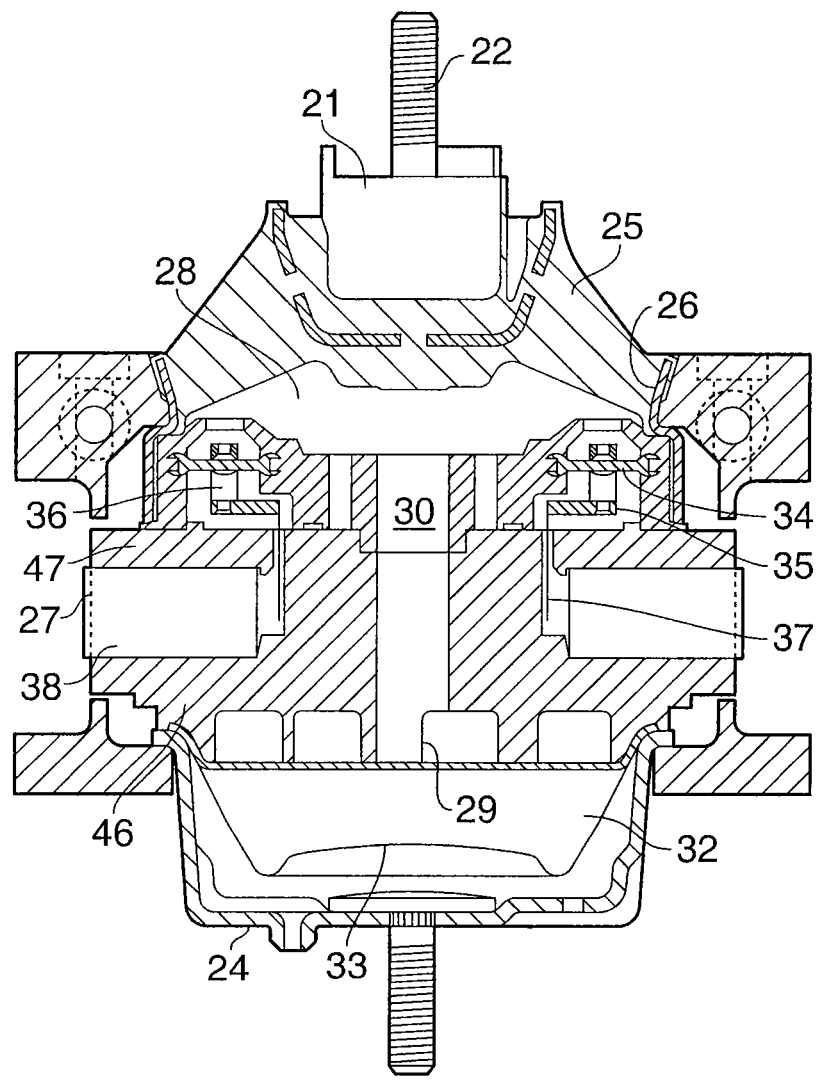
FIG. 8 shows in more detail a first mounting device which may be used in the present invention.

FIG. 8 of the accompanying drawings shows one example of a "cup and boss" type of mounting device, usable with the iterative relationship described previously. The mounting device is for damping vibration between two parts of a structure (not shown), and has a boss 21 connected via a fixing bolt 22 to one of the parts of the structure, and the other part of the structure is connected to a generally U-shaped cup 24. A partition 27 is attached to the cup 24 adjacent a ring 26, and extends across the mouth of the cup 24 and resilient spring 25 of e.g. rubber interconnects the boss 21 and the partition 27. Thus, a working chamber 28 is defined within the mount, bounded by the resilient spring 25 and the partition 27.

The interior of the partition 27 defines a convoluted passageway 29 which is connected to the working chamber 28 via an opening 30 and is also connected via an opening (not shown) to a compensation chamber 32. Thus, when the boss 21 vibrates relative to the cup 24 (in the vertical direction in FIG. 1), the volume of the working chamber 28 will change, and hydraulic fluid in that working chamber 28 will be forced through the passageway 29 into, or out of, the compensation chamber 32. This fluid movement causes damping. The volume of the compensation chamber 32 needs to change in response to such fluid movement, and therefore the compensation chamber 32 is bounded by a flexible wall 33.

In use, the force received by the mounting device is principally parallel to the fixing bolt 22, and this direction defines an axis of the boss 21.

An annular diaphragm is then mounted on the partition 27, which separates the hydraulic fluid in the working chamber 28 from a gas pocket 35. If the partition 34 were able to vibrate freely, vibrations of the boss 21 relative to cup 22 would cause forces in the hydraulic fluid in the working chamber 28 to the applied to the diaphragm 34, causing it to vibrate, and thus change the volume of the gas pocket 35. Such vibration of the partition separating the working chamber 28, from the gas pocket 35 would then be as described in e.g. GB-A-2282430.

However, in this mounting device, the circle defined by the mid line of the annular diaphragm 34 (hereinafter the centre of the diaphragm) is connected via a connector 36 to a coil 37. The coil 37 is annular, and it intersects the magnet circuit formed by an annular permanent magnet 38 and core pieces 46, 47. When a current is applied to the coil 37, it moves axially relative to the permanent magnet 38, thus moving the connector 38 and hence moving the centre of the diaphragm 34. By controlling the current applied to the coil 37, the vibration is then controllable.

Preferably, the current in the coil 37 is controlled to vibrate the diaphragm 38 in harmony with the vibrations of the engines. Under these circumstances, the hydraulically damped mounting device may offer no resistance to the engine vibration and thus may have an effect of zero dynamic stiffness for suitable engine vibration frequency (e.g. in the range of 25 to 500 Hz). However, in addition, the diaphragm 34 separates the working chamber 28 from the gas pocket 35, and thus may be used to tune the passive absorption of large amplitude of low frequency vibration in a similar way to that in EP-A-0115417 or GB-A-2282430.

Thus, by combining the active vibration with the passive vibration-absorbing qualities of the diaphragm 34, an improvement may be achieved. The force applied to the diaphragm 34 from the interaction of the coil 37 and the, magnetic circuit formed by the magnet 38 and the cores 46, 47 apply irrespective of the current position of the diaphragm 34, and thus both the active force applied to the working chamber 28 and the passive vibration-absorbing effect may occur simultaneously. This may further be improved by ensuring that the engine vibration frequencies considered are at a frequency higher than that to which the passageway 27 is tuned. At those frequencies, the passageway 29 is effectively choked so that the movement of the actuator causes pressure fluctuations in the working chamber 28, rather than motion of fluid through the passageway 29.

In this mounting device, the drive to the diaphragm 34 is via a current carrying coil 37 and a permanent magnet. The permanent magnet 38 may be replaced by an electric magnet, and it is also possible to use a variable reluctance device, particularly if a lower frequency range was acceptable.

Figure 9:
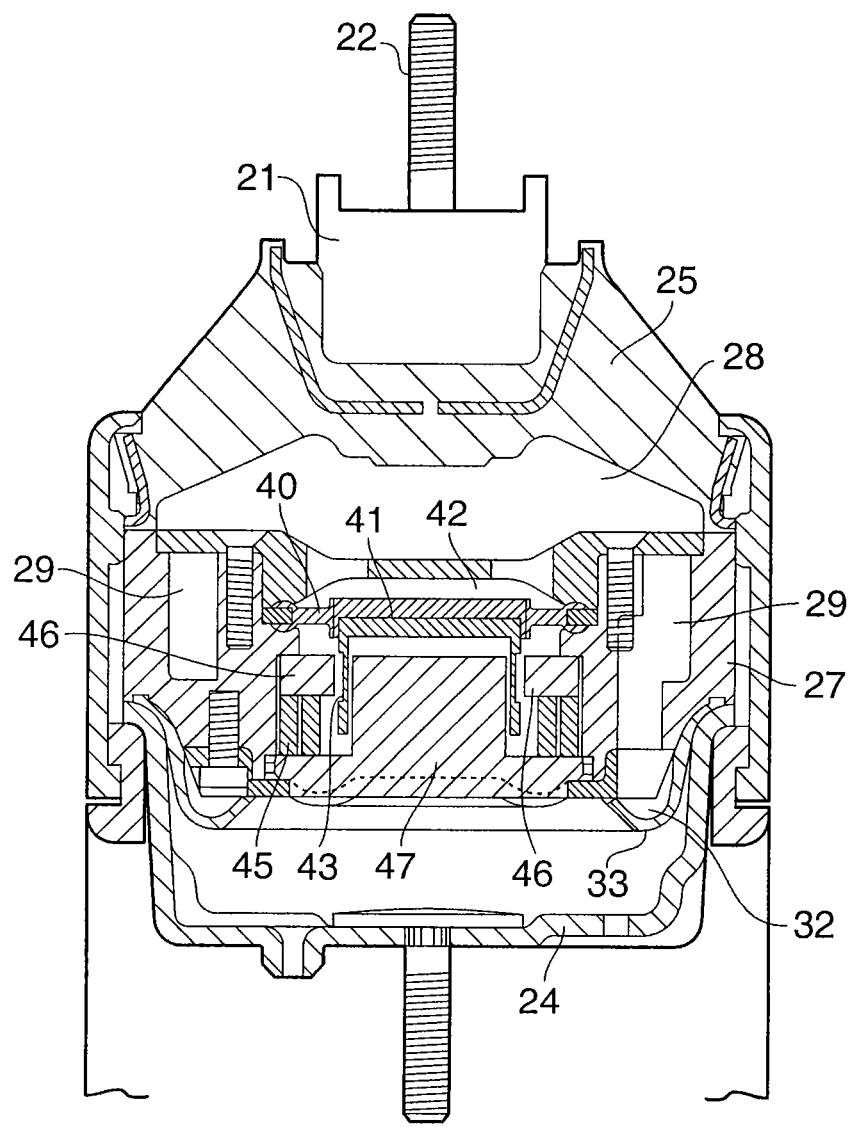
FIG. 9 shows a second mounting device which may be used in the present invention.

In the mounting device of FIG. 8, the diaphragm 34 is annular and the passageway 30 extends through its opening. FIG. 9 illustrates another mounting device, in which the diaphragm is circular, and is surrounded by the passageway 39. In FIG. 9, the parts of the mounting device which correspond to parts of the mounting device of FIG. 8 are indicated by the same reference numerals.

In the mounting device of FIG. 9, the diaphragm is formed by a flexible part 40 and a rigid part 41. They extend to close the mouth of a gas pocket 42 in a similar way to mounting devices disclosed in EP-A-0115417. The flexible part 40 of the diaphragm permits it to vibrate in response to pressure changes in the working chamber 28.

However, in addition, a coil 43 extends down from the rigid part 41 of the diaphragm, and is surrounded by a permanent magnet 45. Thus, by applying a current to the coil 43, the coil 43 may be caused to vibrate relative to the permanent magnet 45, and so causing the rigid part 41 of the diaphragm to move. That movement of the rigid part 41 of the diaphragm is permitted due to flexing of the flexible part 40 of the diaphragm. Again, a magnetic circuit is set up since the permanent magnet 45 is rigidly mounted on the partition 27. Thus, the embodiments of FIGS. 8 and 9 permit a vibration to be applied to hydraulic fluid in the working chamber 28 of a hydraulically damped mounting device, thereby to impart vibrations to that mount, and hence to the structures to which that mount is attached. It is thus possible, to provide active cancellation of vibrations of the structures to which the hydraulically damped mounting device is connected.

The above discussion corresponds to the discussion in GB 2354054. The present invention is concerned with developments and modifications of the arrangements discussed above.

Figure 10:
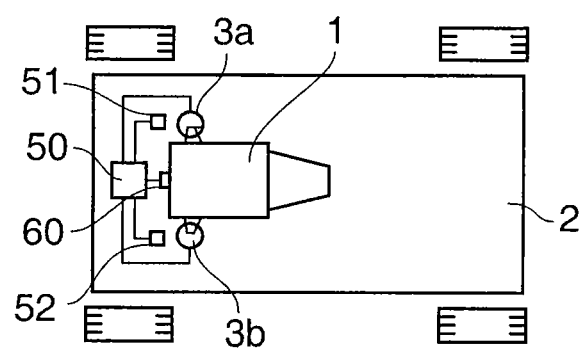
FIG. 10 shows an embodiment of the present invention in which an engine is supported by two mounting devices.
Figure 11:
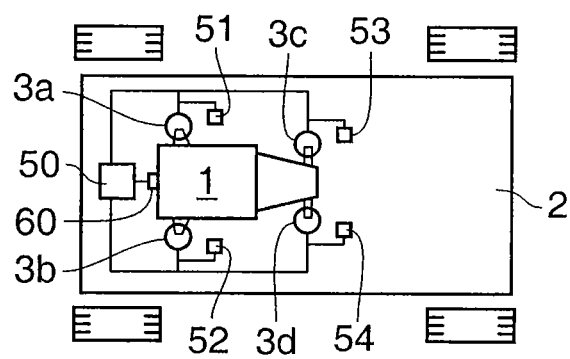
FIG. 11 shows an embodiment of the present invention in which an engine is supported by on a chassis by four mounting devices.

In the arrangement of FIG. 1, the engine 1 is mounted on the chassis 2 via a mounting device 3 which provides active damping of the vibrations of the engine 1 relative to the chassis 2. FIGS. 10 and 11 illustrate embodiments in which there are multiple mounting devices providing such active damping. In the embodiments of FIGS. 10 and 11, components which correspond to components of FIG. 1 are indicated by the same reference numerals, and are not described in further detail.

In the embodiment of FIG. 10, the engine 1 is connected to the chassis via two mounting devices $3a$, $3b$, each of which provides active damping. The devices $3a$, $3b$ may correspond to the mounting devices show in e.g. FIG. 8 or FIG. 9. The mounting devices $3a$, $3b$ are connected to a controller device 50, which is also connected to sensors 51, 52. In such an arrangement, the controller 50 senses the vibrations via sensors 51, 52 and controls the mounting devices $3a$, $3b$ to ensure appropriate damping.

The embodiment of FIG. 11 is similar to that of FIG. 10, but has four mounting devices $3a$, $3b$, $3c$ and $3d$. Again, those mounting devices $3a$ to $3d$ are controlled by controller 50 on the basis of signals from sensors 51 to 54.

The control techniques which are applied to the mounting devices $3a$ and $3b$ in FIG. 10, and $3a$ to $3d$ in FIG. 11 correspond generally to those previously described in reference to FIGS. 2 to 7. However, there is an extra feature that must be present. The controller 50 must co-ordinate the controlling of each mounting device to ensure that they are not driven in way which causes their actions to conflict. Thus, it is necessary for the signals to each mounting device to be related, and thus the terms y, u', and [R] are modified.

In particular, and as previously mentioned y now represents a vector with 2*f elements where f is the number of active mounts e.g. y=[$y_{i1}$ $y_{o1}$ $y_{i2}$ $y_{o2}$ ... ] each $y_{i1}$ $y_{o1}$ pair describes the vector (phasor) representation of the error signal as in the existing patent. Similarly u now represents a vector with 2*f elements e.g. u'= [$u_{i1}$ $u_{o1}$ $u_{i2}$ $u_{o2}$ ... ]. Each $u_{i1}$ $u_{o1}$ pair describes the vector (phasor) representation of the output signal as in GB-A-2354054. [R] now represents a 2*f by 2*f matrix.

Hence, for the mount of FIG. 10, f=2 and y and u are vectors with four elements.

Thus, for the 2 mount system of FIG. 10, [R] is given by the following matrix:

$$r11,1-r11,2r12,1-r12,2r11,2r11,1r12,2r12,1r21,1-r21,2r22,1-r22,2r21,2r21,1r22,2r22,1$$

In this case [R] has 8 unknowns which are solved at each iteration from the following:

$$(y_n - y_{n-1}) = [R](u_n - u_{n-1}) \ldots$$
equivalent to 4 equations $$(y_{n-1} - y_{n-2}) = [R](u_{n-1} - u_{n-2}) \ldots$$
equivalent to 4 where $y_n$=y at the nth iteration.

Thus, in the two mount case where f=2, $$u_{(n+1)} = u_{(n)} - A[R_n]^{-1} y_n + p_n.$$

where: $u_n$=[$u_{i1}$, $u_{o1}$, $u_{i2}$, $u_{o2}$] is the control output signal at the $n^{th}$ iteration.$y_n$= [$y_{i1}$, $y_{o1}$, $y_{i2}$, $y_{o2}$] is the measured vibration signal at the $n^{th}$ iteration p=[$p_{i1}$, $p_{o1}$, $p_{i2}$, $p_{o2}$] is an optional perturbation added to the control output of the $n^{th}$ iteration where

[$u_{i1}$, $u_{o1}$] forms the frequency domain vector representation of the sinusoidal signal sent to a first mounting device.

[$u_{i2}$, $u_{o2}$] forms the frequency domain vector representation of the sinusoidal signal sent to a second mounting device.

[$y_{i1}$, $y_{o1}$] forms the frequency domain vector representation of the sinusoidal signal measured at a first detection point

[$y_{i2}$, $y_{o2}$] forms the frequency domain vector representation of the sinusoidal signal measured at a second detection point

[$p_{i1}$, $p_{o1}$] forms the frequency domain vector representation of the optional perturbation added to the control signal sent to the first mounting device

[$p_{i2}$, $p_{o2}$] forms the frequency domain vector representation of the optional perturbation added to the control signal sent to the second mounting device- Preferably, the signals are sinusoidal ones, and the frequency of each sinusoidal signal is at any one of the identified Fourier components of vibration output y(t) being cancelled. The frequency domain vector indicates the amplitude of the signal relative to the respective Fourier component in the vibration input signal x(t)

Thus: $u_{i1}$=the amplitude of the sinusoidal signal sent to the actuator of the first mount in a two mount system which is in-phase with the respective Fourier component of the vibration input signal x(t).

$u_{o1}$=the amplitude of the sinusoidal signal sent to the actuator of the first mount in a two mount system which is out-of-phase with the respective Fourier component of the vibration input signal x(t).

$u_{i2}$=the amplitude of the sinusoidal signal sent to the actuator of the second mount in a two mount system which is in-phase with the respective Fourier component of the vibration input signal x(t).

$u_{o2}$=the amplitude of the sinusoidal signal sent to the actuator of the second mount in a two mount system which is out-of-phase with the respective Fourier component of the vibration input signal x(t).

$y_{i1}$=the amplitude of the sinusoidal signal measured at the first detection point in a two mount system which is in-phase with the respective Fourier component of the vibration input signal x(t).

$y_{o1}$=the amplitude of the sinusoidal signal measured at the first detection point in a two mount system which is out-of-phase with the respective Fourier component of the vibration input signal x(t).

$y_{i2}$=the amplitude of the sinusoidal signal measured at the second detection point in a two mount system which is in-phase with the respective Fourier component of the vibration input signal x(t).

$y_{o2}$=the amplitude of the sinusoidal signal measured at the second detection point in a two mount system which is out-of-phase with the respective Fourier component of the vibration input signal x(t).

$p_{i1}$=the amplitude of the optional sinusoidal perturbation signal added to the control signal sent to the actuator of the first mount in a two mount system which is in-phase with the respective Fourier component of the vibration input signal x(t).

$p_{o1}$=the amplitude of the optional sinusoidal perturbation signal added to the control signal sent to the actuator of the first mount in a two mount system which is out-of-phase with the respective Fourier component of the vibration input signal x(t).

$p_{i2}$=the amplitude of the optional sinusoidal perturbation signal added to the control signal sent to the actuator of the second mount in a two mount system which is in-phase with the respective Fourier component of the vibration input signal x(t).

$p_{o2}$=the amplitude of the optional sinusoidal perturbation signal added to the control signal sent to the actuator of the second mount in a two mount system which is out-of-phase with the respective Fourier component of the vibration input signal x(t). Moreover, it is preferable that A is a scalar value such that $0<A<1$ $[R_n]^{-1}$ is the inverse of the system gain matrix [R] calculated from $u_n$, $u_{n-1}$, $u_{n-2}$, $y_n$, $y_{n-1}$, $y_{n-2}$;

such that $$(y\_n-y\_n-1)=[Rn](u\_n-u\_n-1)(1)(y\_n-1-y\_n-2)=[Rn](u\_n-1-u\_n-2)[R]=r11,1-r11,2r12,1-r12,2r11,2r11,1r12,2r12,1r21,1-r21,2r22,1-r22,2r21,1r22,2r22,1(2)$$

Thus the eight coefficients $r_{11,1}$ $r_{11,2}$ $r_{12,1}$ $r_{12,1}$ $r_{21,1}$ $r_{21,2}$ $r_{22,1}$ $r_{22,2}$ of [R] are solved using (1), (2) above. Ie by solving the following eight simultaneous equations $$y_{i1,n} = r_{11,1} * \Delta u_{i1,n} - r_{11,2} * \Delta u_{o1,n} + r_{-12,1} * \Delta u_{i2,n} - r_{12,2} * \Delta u_{o2,n},$$

$$y_{o1,n} = r_{11,1} * \Delta u_{i1,n} + r_{11,2} * \Delta u_{o1,n} + r_{-12,2} * \Delta u_{i2,n} + r_{12,1} * \Delta u_{o2,n},$$

$$y_{i2,n} = r_{21,1} * \Delta u_{i1,n} - r_{21,2} * \Delta u_{o1,n} + r_{-22,1} * \Delta u_{i2,n} - r_{22,2} * \Delta u_{o2,n},$$

$$y_{o2,n} = r_{21,1} * \Delta u_{i1,n} + r_{21,2} * \Delta u_{o1,n} + r_{-22,2} * \Delta u_{i2,n} + r_{22,1} * \Delta u_{o2,n},$$

$$y_{i1,n-1} = r_{11,1} * \Delta u_{i1,n-1} - r_{11,2} * \Delta u_{o1,n-1} + r_{12,1} * \Delta \Delta u_{i2,n-1} - r_{12,2} * \Delta u_{o2,n-1},$$

$$y_{o1,n-1} = r_{11,1} * \Delta u_{i1,n-1} + r_{11,2} * \Delta u_{o1,n-1} + 2 * \Delta u_{i2,n-1} + r_{12,1} * \Delta u_{o2,n-1},$$

$$y_{i2,n-1} = r_{21,1} * \Delta u_{i1,n-1} - r_{21,2} * \Delta u_{o1,n-1} + r_{22,1} * \Delta u_{i2,n-1} - r_{22,2} * \Delta u_{o2,n-1},$$

$$y_{o2,n-1} = r_{21,1} * \Delta u_{i1,n-1} + r_{21,2} * \Delta u_{o1,n-1} + r_{22,2} * \Delta u_{i2,n-1} + r_{22,1} * \Delta u_{o2,n-1},$$

where:
$y_{i1,n} = (y_{i1,n} - y_{i1,n-1})$
$y_{o1,n} = (y_{o1,n} - y_{o1,n-1})$
$y_{i2,n} = (y_{i2,n} - y_{i2,n-1})$
$y_{o2,n} = (y_{o2,n} - y_{o2,n-1})$
$u_{i1,n} = (u_{i1,n} - u_{i1,n-1})$
$u_{o1,n} = (u_{o1,n} - u_{o1,n-1})$
$u_{i2,n} = (u_{i2,n} - u_{i2,n-1})$
$u_{o2,n} = (u_{o2,n} - u_{o2,n-1})$
$y_{i1,n-1} = (y_{i1,n-1} - y_{i1,n-2})$
$y_{o1,n-1} = (y_{o1,n-1} - y_{o1,n-2})$
$y_{i2,n-1} = (y_{i2,n-1} - y_{i2,n-2})$
$y_{o2,n-1} = (y_{o2,n-1} - y_{o2,n-1})$
$u_{i1,n-1} = (u_{i1,n-1} - u_{i1,n-2})$
$u_{o1,n-1} = (u_{o1,n-1} - u_{o1,n-2})$
$u_{i2,n-1} = (u_{i2,n-1} - u_{i2,n-2})$
$u_{o2,n-1} = (u_{o2,n-1} - u_{o2,n-2})$ For the embodiment of FIG. 11, f=4 and thus y and u have eight elements and the matrix corresponding to [R] is an 8×8 matrix.

By linking together the iterative calculation arrangement for the mounting devices this way, suitable control can be achieved.

In the arrangements discussed above with reference to FIGS. 2 to 7, an estimate was made of the frequency $\omega$, but it is possible to make use of a value corresponding to the rotation of the engine. Thus, and as shown in FIGS. 10 and 11, a sensor 60 may be provided which determines the rate of rotation of the engine 1, and provides an input into the controller 50.

Figure 12A:
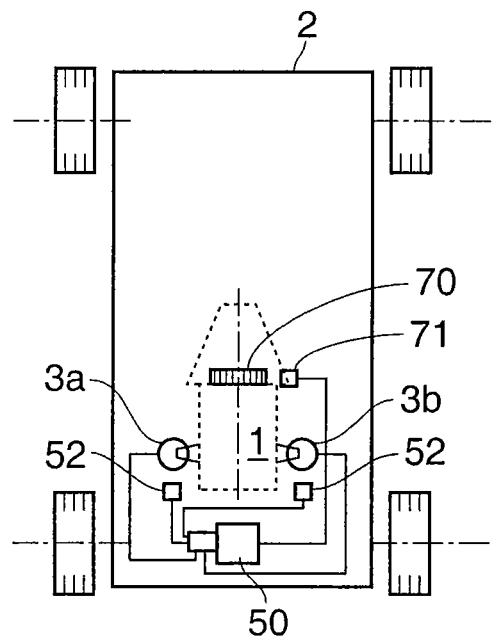
FIGS. 12a and 12b shows a modification of the embodiment of FIG. 10, using crank angle sensor.
Figure 12B:
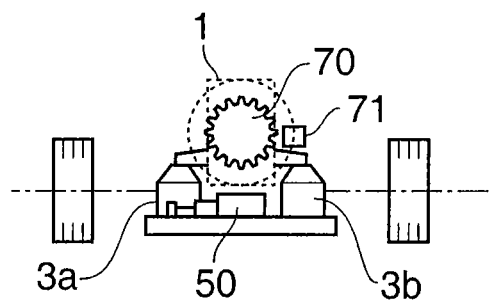

Such sensing of engine rotation is illustrated in more detail in FIGS. 12a and 12b. The arrangement shown in FIGS. 12a and 12b corresponds generally to that shown in FIG. 10, and corresponding parts are indicated by the same reference numerals. However, in FIGS. 12a and 12b, a toothed flywheel 70 is mounted on an output shaft of the engine 1 and a sensor 71 is mounted adjacent the periphery of that flywheel 70, to detect the passage of the teeth. Such an arrangement, usually known as a crank angle sensor, is already known to derive a measurement for timing engine firing and fuel injection systems. Typically, the sensor 71 is a Hall effect sensor and each pulse from the Hall sensor indicates a fractional increment in the rotation of the flywheel 70, and hence rotation of the engine shaft on which the flywheel 70 is mounted. Intermediate rotation can then be interpolated.

Thus, if it is supposed that the toothed flywheel 70 has h teeth, the instantaneous crank angle in degrees .theta.(t) is given by:

.theta.($t$)=[($t$-$TN$)($TN$-$TN$-1)+$N$].times.360 $h$ where T.sub.N is the time when the Nth tooth was sensed where N is the number of the tooth (from some reference point) which was sensed by the sensor 71 immediately prior to time t.

In practice, .theta. is sampled at multiple times, to give a series of samples, which will be referred to as .theta.(m) where m is the sample number. Thus, the equation above becomes:

.theta.($m$)=($t$($m$)-$TNTN$-$TN$-1)360$h$ where t(m) is the time of the mth sample. Then, the resulting values of .theta.(m) can be used to calculate y.sub.i,n and y.sub.o,n as given by:

$y$.sub.$i,n$=sum($y$($m$)sin .theta.($m$))/sum(.theta.($m$)-.theta.($m$-1))

$y$.sub.$o,n$=sum($y$($m$)cos 2($m$))/sum(.theta.($m$)-.theta.($m$-1))

As mentioned above, the vibrations may be at harmonics of the engine speed, and thus the values of y.sub.i,n, and y.sub.o,n may be generalised to the following, where c is the harmonic number:

$y$.sub.$i,n$=sum($y$($m$)sin($c$.theta.($m$))/sum($c$.theta.($m$)-$c$.theta.($m$-1))

$y$.sub.$o,n$=sum($y$($m$)cos($c$.theta.($m$))/sum($c$.theta.($m$)-$c$.theta.($m$-1))

In each case, the sums are carried out over successive samples (m) from 1 to K, by processing a block of samples of fixed length (e.g. "k"). Preferably k is equal to the number of samples in a time period which is one to four times the period of the frequency to be cancelled.

The next output phase u' is determined as before $u'$.sub.$n$+1+$u'$.sub.$n$-$A$[$R$.sub.$n,n$-1].sup.-1$y$.sub.$n$ where u'.sub.n+1 has in and out of phase components u.sub.i and u.sub.o, y.sub.n comprises in and out of phase components y.sub.i and y.sub.o with direct crank angle measurement out signal at the (m) sample is thus formed by the following expression $u$.sub.$n$+1($m$)=$u$.sub.$i$ sin($c$.theta.($m$))+$u$.sub.$o$ cos ($c$.theta.($m$))

So far, discussion of the development of this invention, and the discussion of GB 2354054, has been concerned with suppressing vibrations. However, it is possible to modify those ideas to be able to use a mounting device to generate vibrations, either in addition to, or instead of, suppressing vibrations.

At first sight, the generation of vibrations, rather than the suppression of vibrations, may be thought undesirable. However, there are some situations where it is desirable to generate sound, or other vibrations which could give a advantageous, rather than disadvantageous, effect.

For example, it may be desirable to generate sounds which would make the engine sound more powerful, or more refined, than it actually was.

In the simplest embodiment of this idea, it is possible to drive the coil 37 in FIG. 8, or the coil 43 in FIG. 9 at a desired frequency and phase, to impose on the mounting device a predetermined vibration. A frequency signal to the coil 37, 43 may be derived from a suitably tuned oscillator. The frequency and phase to which the oscillator is tuned may correspond to the frequency and phase of the rotation of the engine, or may be some other frequency.

Alternatively, where the engine has a shaft angle sensor such as illustrated in FIGS. 12a and 12b, the signal to the coil 37, 43 may be derive directly from that sensor.

However, in this development of this embodiment, it is desirable that not only is a desired vibration is applied to the mount, but also that undesirable vibrations are suppressed. This thus combines the idea of generating desired vibrations with the idea of suppressing unwanted vibrations, which has previously been described.

Since this aspect proposes that the vibration is a harmonic of engine speed, it is possible for the value of the harmonic to be derived from a shaft being driven by the engine, as in the arrangement of FIGS. 12a and 12b as discussed above. Thus, a value of .theta. may be derived in a way previously described, using the sensor 71, and that value then used as a measure of the vibration. Thus, it becomes possible to make use of harmonics of the angle measurement .theta. as being equivalent to harmonics of frequency .omega..

It was previously mentioned that for the nth iteration, $U'$.sub.$n$+1=$u'$.sub.$n$-$A$[$R$.sub.($n,n$-1)].sup.-1$y$.sub.$n$+ $p$.sub.$n$ $p$.sub.($n$+1)=-$p$.sub.($n$)

In that case, for a given harmonic c of angle measurement .theta., the output from the controller u(m) at the mth sample is given by:

$u$($m$)=$u$.sub.$i$ sin($c$.theta.($m$))+$u$.sub.$o$ cos($c$.theta.($m$))

where c is harmonic of the frequency to be cancelled.

Then in a further equation for u(m) it is possible to add an additional harmonic of angle measurement .theta. to suppress the sound of the cth harmonic but to add the sound of the dth harmonic.

u(m) is then given by:

$u$($m$)=$u$.sub.$i$ sin($c$.theta.($m$))+$u$.sub.$o$ cos($c$.theta.($m$))+$B$.sub.$i$ sin($d$.theta.($m$))+$B$.sub.$o$ cos ($d$.theta.($m$))

In this equation B.sub.i+B.sub.o represent the amplitude of the in-phase and out-of-phase components of added vibration relative to the crank angle reference at the dth harmonic.

This process may be applied to multiple harmonics to give the equation:

$u$($m$)=$u$.sub.$i$.sub.1 sin($c$.sub.1.theta.($m$))+$u$.sub.$o$-.sub.1

$$\cos(c_1\theta(m)) + B_i{}_1 \sin(d_1(\theta(m)) + B_o{}_1$$

$$\cos(d_1\theta(m)) + u_i{}_2 \sin(c_2\theta(m)) + u_o{}_2$$

$$\cos(c_2\theta(m)) + B_i{}_2 \sin(d_2\theta(m)) + B_o{}_2 \cos(d_2\theta(m)) + \ldots$$

This development of the present invention may be embodied in the structures illustrated in FIGS. 10 and 11. As has previously been mentioned, the sensor 60 determines the rate of rotation of the engine 1. Then, the mounting devices 3a, 3b, 3c or 3d may be driven by the equation given above.

The development discussed above has assumed that this development is used to suppress unwanted vibrations, and to impose additional vibrations at the dth harmonic. However, it is possible within this development for there to be no suppression of unwanted vibrations. In this case, the mounting device is driven to vibrate at the dth harmonic only. In such a case, u(m) is given by the following equation:

$$u(m) = B_i \sin(d\theta(m)) + B_o \cos(d\theta(m))$$

The mounting device illustrated in e.g. FIGS. 8 and 9 may be used with this development, with signals being provided to the coils 37, 43 to generate an appropriate vibration.

What is claimed is:

1. A method of controlling vibrations between two parts of a structure via at least one mounting device connected between the two parts of the structure, wherein:
   a source frequency value is derived from at least one of the two parts and/or structural vibrations therebetween;
   a signal representing at least one harmonic of said source frequency value is derived, at least one of the at least one harmonic being at a frequency different than the source frequency; and
   the mounting device is controlled to generate a force between the two parts, based on the derived signal, such as to drive said two parts to vibrate to increase an amplitude of structural vibration at a frequency of the at least one harmonic.

2. A method according to claim 1, wherein a phase value is also derived from the at least one of the two parts and/or the vibrations therebetween, and the mounting device is controlled such that the two parts are driven to vibrate with a phase related to the derived phase value.

3. A method according to claim 1 further including:
   damping vibrations between the two parts of the structure, detecting the vibrations between the two parts of the structure, generating a variable force to oppose the vibrations, and detecting any resultant vibration due to a net effect of said vibrations and said variable force; wherein
   the force is generated under control of a controller on the basis of an iterative relationship, the iterative relationship being such as to generate the force of one iteration using a controller output signal in frequency domain vector form derived from the controller output signal of an immediately previous iteration in frequency domain vector form plus a frequency domain vector quantity derived from the resultant vibration of more than one previous iteration.

4. A method according to claim 1 wherein there are f active mounting devices, wherein f is an integer greater than one, and the method further includes the steps of damping vibrations between the two parts of the structure, detecting the vibrations between the two parts of the structure, generating variable forces to oppose the vibrations in each of the f mounting devices, and detecting any resultant vibrations due to a net effect of said vibrations and said variable forces;
   wherein the variable forces are generated under control of a controller on the basis of an iterative relationship, the iterative relationship being such as to generate the forces of one iteration using controller output signals in frequency domain vector form derived from the controller output signals off immediately previous iterations in frequency domain vector form plus a frequency domain vector quantity derived from the controller output signals and the resultant vibration of more than f previous iterations, whereby the variable forces are generated to oppose vibrations at frequencies other than the at least one harmonic while at the same time generating the force to increase an amplitude of structural vibration at a frequency of the at least one harmonic.

5. An apparatus for controlling vibrations between two parts of a structure via at least one active mounting device connected between the two parts of the structure, comprises:
   a detector for detecting structural vibrations between the two parts of the structure and generating a source frequency value from at least one of the two parts and/or the vibrations therebetween;
   a generator for generating a signal representing at least one harmonic of said source frequency value, the at least one harmonic being at a frequency different than the source frequency; and
   a controller for controlling the at least one mounting device to generate a force between the two parts, based on the signal, and configured to drive said two parts to vibrate to increase an amplitude of structural vibration at a frequency of the at least one harmonic.

6. An apparatus according to claim 5, wherein the generator is arranged to derive a phase value from the at least one of the two parts and/or the vibrations therebetween, and the controller is arranged to control the mounting device such that the two parts are driven to vibrate with a phase related to the derived phase value.

\* \* \* \* \*